(No Model.)
H. G. DENNIS.
BELL JOINT FOR COUPLING PIPES.
No. 249,025. Patented Nov. 1, 1881.
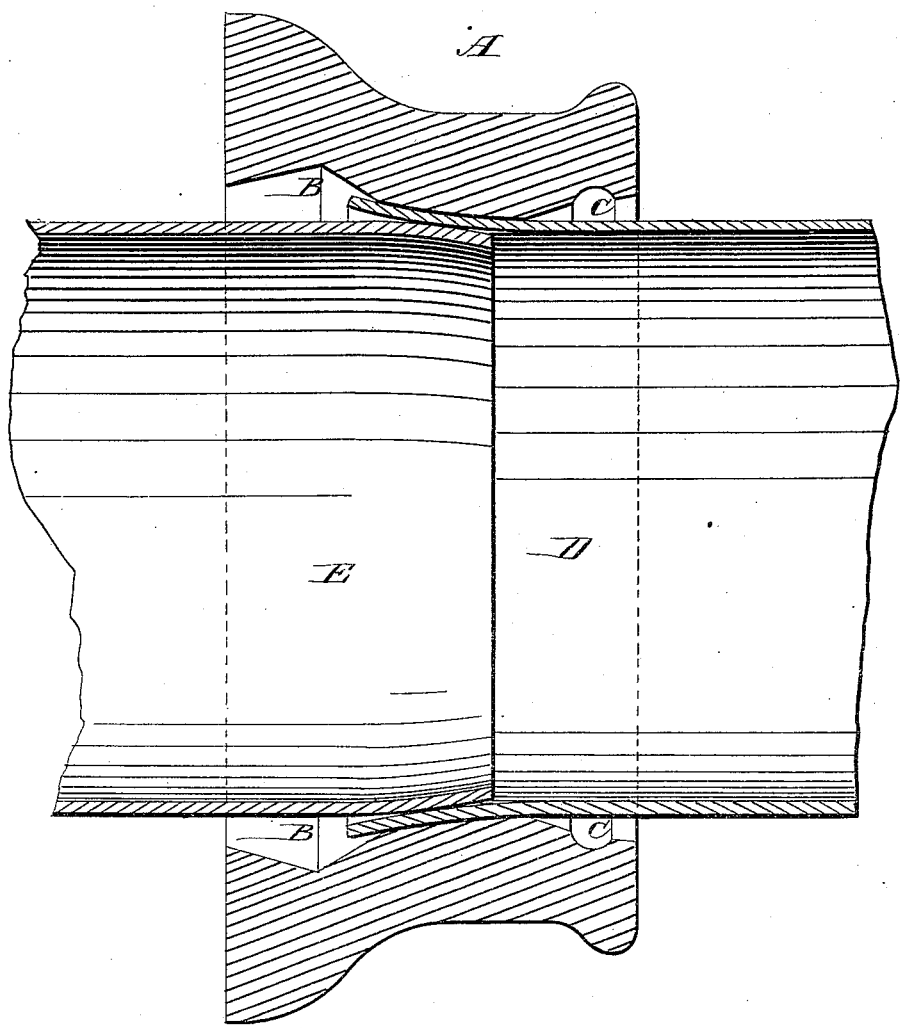
WITNESSES:
Francis McArdle.
C. Sedgwick
INVENTOR:
H. G. Dennis
BY Munn & Co
ATTORNEYS.

UNITED STATES PATENT OFFICE.

HENRY G. DENNIS, OF NEW BEDFORD, MASSACHUSETTS.

BELL-JOINT FOR COUPLING PIPES.

SPECIFICATION forming part of Letters Patent No. 249,025, dated November 1, 1881.

Application filed August 16, 1881. (No model.)

*To all whom it may concern:*

Be it known that I, HENRY G. DENNIS, of New Bedford, Bristol county, Massachusetts, have invented a new and Improved Bell-Joint for Coupling Pipes, of which the following is a specification.

The object of my invention is to provide a secure and simple joint for metal pipes.

The invention consists in a beveled or bell-shaped collar provided in the inner surface with a groove or rabbet a short distance from each mouth of the collar. The latter is mounted on the enlarged or swaged end of a pipe, which receives the contracted end of another pipe. The rabbets of the collar are then filled with molten lead or other suitable filling and thoroughly driven.

In the accompanying drawing a longitudinal sectional elevation of two pipes united by means of my improved bell-joint is shown, the collar being shown in cross-section.

The beveled or bell-shaped collar A is provided with an internal rabbet, B, a short distance from the edge of the larger end of the collar, and with an internal rabbet, C, a short distance from the edge of the smaller end. This collar is made of cast-iron, and is driven on the enlarged or swaged end of a wrought-iron pipe, D. The collar or bell A can be driven on the pipe D at the works or in the ditch, or it can be shrunk on the pipe D at the manufactory. The contracted end of a pipe, E, is passed and driven into the enlarged or swaged end of the pipe D, upon which clay rolls are placed against the ends of the collar A, and the rabbets B and C are filled with molten lead or other suitable molten metal, thus forming an absolutely safe and tight joint at both ends of the collar A. The lead poured in the rabbet B completely covers the line of contact of the two pipes D and E. The lead poured in the rabbet C and well driven prevents all leakage at the rear or smaller end of the collar. With this joint the pipes can be of the most simple construction and require no shoulders, and the pipes can be joined very rapidly, conveniently, and economically.

If desired, the pipes D and E can be simply abutted against each other; but I prefer the construction shown.

Having thus described my invention, I claim as new as far as perfected—

In a pipe-joint, the combination, with the pipe D, swaged or enlarged at the end, and with the pipe E, contracted at the end, of the collar A, provided with internal rabbets, B and C, near the mouths of the collar, substantially as herein shown and described, and for the purpose set forth.

HENRY GILES DENNIS.

Witnesses:
   F. D. HOWE,
   J. R. CONANT.